Patented Dec. 17, 1946

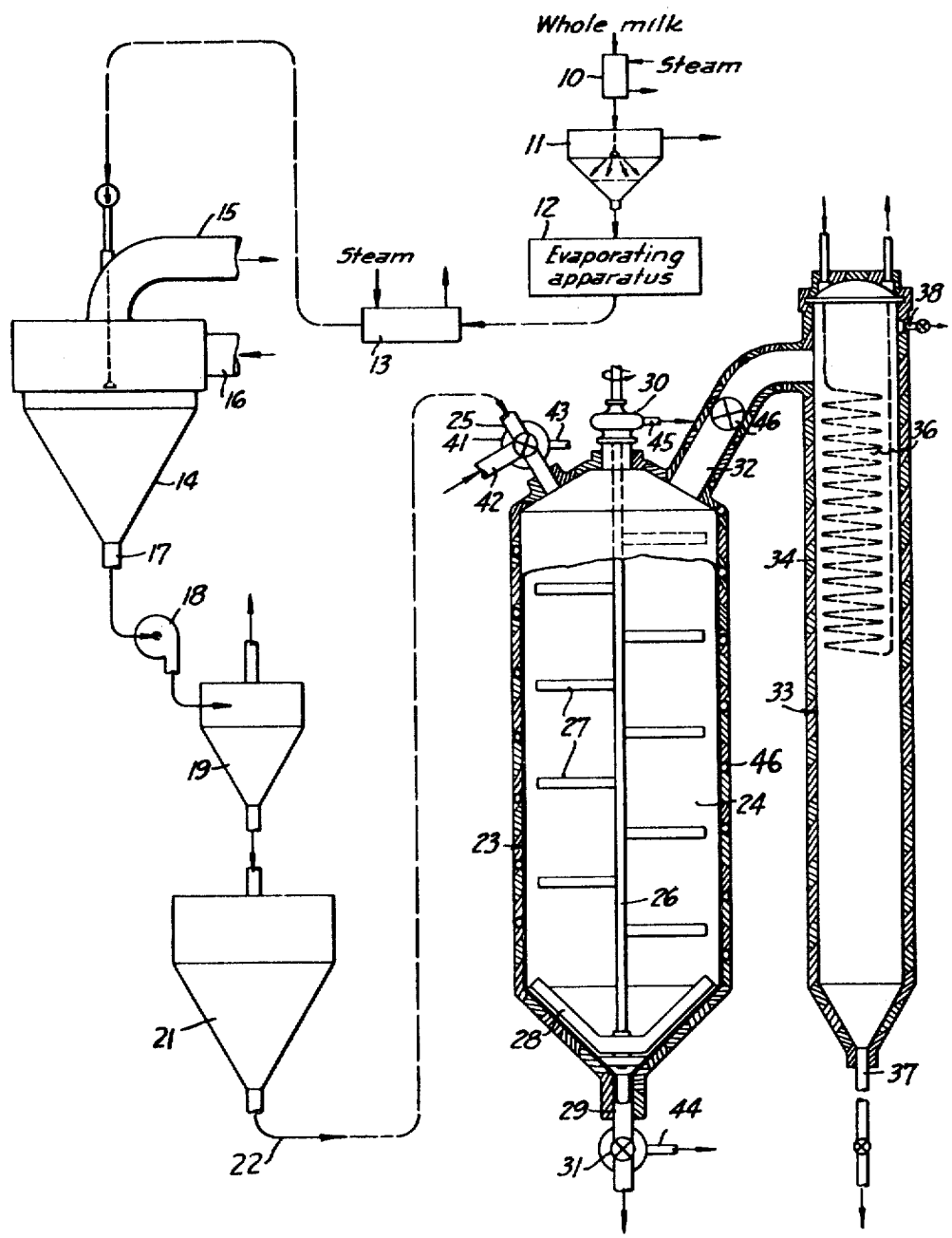

2,412,635

UNITED STATES PATENT OFFICE 2,412,635

PROCESS FOR PRODUCING DRIED MILK POWDER

Paul F. Sharp, Piedmont, Calif., assignor to Golden State Company, Ltd., San Francisco, Calif., a corporation of Delaware Application November 25, 1943, Serial No. 511,717

11 Claims. (Cl. 99—201)

This invention relates generally to processes for the manufacture of dry divided milk products from liquid lacteal materials, and to the preservation of such products.

In prior processes for producing powdered milk products such as whole milk it has been found desirable to reduce the moisture content to a relatively low value of the order of from 1½ to 2½%. Where drying equipment of the drum or roller type is employed, this is accomplished by application of additional heat and drying time, until the desired low moisture content is obtained. Where spray drying is employed, additional heated drying air is introduced into the drying chamber, or the material may be partially dried to powdered form in a primary drying chamber, and thereafter further subjected to hot drying air for a secondary drying to the final moisture content. Such prior drying methods have certain inherent disadvantages. For example by prolonging heat treatment the capacity of the drying equipment is necessarily reduced, and heat sensitive components of the material may be detrimentally affected. Use of secondary drying increases the capacity of apparatus employed for the primary drying operation, but the secondary drying itself is detrimental to the keeping properties of the product, particularly in that the hot air to which the material is exposed promotes oxidation of the fat content. Where it is attempted to reduce the moisture content to a value of say 1½ to 2½% without secondary drying, the product is discharged in heated condition. Unless this hot material is immediately cooled its quality is seriously impaired, particularly because complex chemical changes in the material which are associated with deterioration in quality, tend to proceed at an accelerated rate at temperatures of the order of from 150 to 185° F., while in contact with air. One method which has been employed for cooling the powdered material is to contact the material with cool air, but when employing this procedure it is frequently difficult to prevent reabsorption of moisture, and in addition such cooling can not be carried out as rapidly as desired. Furthermore during such cooling the material is subjected to oxidation by virtue of the oxygen in the cooling air.

Attempts have been made in the past to inhibit oxidation of dry milk products, after their manufacture, by subjecting the same to a vacuum for removal of free oxygen. It has been found that such methods as ordinarily practiced have a substantial amount of free oxygen in the material, and on storage the material tends to develop a stale flavor because of continued oxidation of non-fat solids.

It is an object of the present invention to provide a process for the manufacture of powdered milk products which will enable production of low moisture contents without the difficulties encountered in prior processes, and with the production of a high quality material having good keeping properties.

Another object of the invention is to provide a process of the above character which will enable reduction in the moisture content of milk powder to a low value where permanent keeping is assured, and without detrimentally exposing the product to hot air during the final drying stage.

A further object of the invention is to provide a process which will reduce the final moisture content of milk solids while at the same time effectively removing free oxygen.

A further object of the invention is to provide a process which will treat hot powdered milk immediately after a primary drying operation, and which will quickly cool the material and reduce its moisture content to a desired low value.

A further object of the invention is to provide a process which will retard development of a stale flavor due to oxidation of non-fat solids.

Additional objects of the invention will appear from the following description in which the preferred embodiment has been set forth in detail in conjunction with the accompanying drawing.

The present process involves use of suitable equipment for removing moisture from liquid lacteal material to produce an ostensibly dry divided material, but which however has a moisture content higher than that desired in the final product. A mass of this material while hot is then subjected to a relatively high vacuum, whereby rapid evolution of moisture occurs and the material is cooled to a comparatively low temperature. Simultaneously with evolution of moisture, free oxygen, such as may be occluded or entrapped with the particles of the powder, is effectively removed. By properly controlling the vacuum treatment one can produce a final powdered material having a desired low moisture content, as for example of the order of from 1½ to 2½% and at the same time reduce the free oxygen to less than 1%.

For the first drying operation one can use conventional driers of the roller or spray type, with or without previous concentration by evaporation. Powdered material discharged from such driers is at an elevated temperature, and this hot material is then progressed to the final treatment, thus avoiding reheating of the powder or retention of the same at an elevated temperature for detrimentally long periods of time.

The drawing diagrammatically represents a particular procedure and equipment which can be used for practicing the invention. In this instance whole milk which may be clarified as by centrifuging, is passed through a heater 10 where it is rapidly heated to an elevated temperature of the order of from 130 to 140° F., after which it is flashed or permitted to expand in the evacuated chamber 11, which is maintained at a suitable vacuum such as 28 inches of mercury. This serves the purpose of effectively removing incorporated air and has been found desirable in preserving the vitamin C content of the material. The deaerated material is then passed to the evaporating equipment 12 which can be of the vacuum type, and where the moisture content is reduced to a desired value, as for example from 40 to 55% solids. Either before, during or immediately after this evaporating operation, it is desirable to pass the material through a heater 13 where it is rapidly heated to an elevated temperature of from 180 to 230° F. This treatment serves to produce substances in the milk which tend to prevent oxidation of fats and deterioration of certain vitamin values, particularly vitamin C.

The milk concentrate is then subjected to drying or desiccation to convert the same to the form of a powder. Apparatus 14 shown in the drawing for this purpose is a spray drier, which for example may be of the Gray-Jensen type. Heated drying air is introduced through the inlet conduit 16 and air ladened with moisture is exhausted through conduit 15. The spray drier is operated in such a manner that the resulting powdered material removed through outlet conduit 15, has a moisture content considerably greater than that desired in the final product, as for example of the order of from 3½ to 5%. Such operation involves proper control with respect to the rate of atomization of the concentrate, and the flow rate and temperature of the incoming drying gas. By way of example, in one specific instance the drier produced powdered whole milk having a moisture content between 3½ to 5% when adjusted to provide air entrance through the conduit 16 at a temperature of from 280 to 300° F. Under such conditions of operation the powdered material discharged through conduit 17 was at a temperature of the order of from 175 to 185° F.

The hot powdered material removed through conduit 17 is shown being delivered by blower 18 to the centrifugal separator 19, where it is separated out from the drying gas. It is then shown passing to the receiver or storage hopper 21. From hopper 21 the material is shown being delivered through conduit 22 to a special vacuum treatment apparatus 23.

The vacuum treatment apparatus 23 has been shown including a chamber 24, which has its inlet pipe 26 connected to the conduit 22 from tank 21. Within the chamber 24 there is a suitable mechanical agitating means, consisting for example of a rotatable rod 26 extending into the chamber through the bearing and sealing gland 27. Rod 26 is shown provided with radially extending flights 27, and the bottom stirring flights 28. The powdered material can be discharged through the lower end of chamber 24 through outlet pipe 29, which is provided with a suitable shut-off valve 31.

The upper part of chamber 24 is connected by pipe 32 to a source of vacuum, through the vacuum condenser 33. This condenser can consist for example of a condensing chamber 34 having cooling coils 36 in its upper portion, and having its lower end connected to the condensate pipe 37. Pipe 38 represents a connection to a suitable evacuating pump. Suitable cooling liquid is circulated through the coils 36. Pipe 37 can be an extended barometric leg.

The inlet pipe 26 to chamber 24 is shown provided with a three way valve 41 having one operating position in which powder may enter chamber 24 through pipe 26, a second position in which pipe 26 is closed, and a third position in which the chamber is placed in communication with a venting pipe 42. It is preferable to have this pipe connected to a source of inert gas, such as nitrogen.

The valves 31 and 41 as well as the bearings for the agitator shaft 26, should be designed to prevent admission of air. For example as diagrammatically indicated the valves 31 and 32 can be jacketed where their operating members extend from the bodies of the valves, and these jackets can then be connected to a source of vacuum by pipes 43 and 44. Similarly the gland 27 about shaft 26 can be provided with an inner compartment surrounding the shaft and connected to a source of vacuum by pipe 45. Chamber 23, pipe 32 and condensing chamber 34 are all shown provided with external heat insulation. Also the walls of chamber 23 are preferably heated by suitable means such as the pipes 46 through which hot water can be circulated.

Operation of the process and apparatus described above can be reviewed as follows: The whole milk after being heated at 10 and deaerated at 11 is concentrated at 12. The concentrate after being heated at 13 is applied to the atomizing nozzle of the spray drier 14. Within the spray drier the material is reduced to a moisture content of say 3½%, and as delivered to the storage tank 21 it is at a temperature of the order of from 170 to 180° F. Storage within this chamber is for a relatively short interval and makes possible use of evacuating apparatus 23 of the batch type. In the event evacuating apparatus of the continuous type is employed, such storage can be minimized or omitted in entirety. Before the powdered material has had an opportunity to cool to an appreciable extent, it is introduced into the chamber 24, after which valve 41 is closed and valve 45 is opened to evacuate the chamber and thereby subject the powdered material to a relatively low pressure of the order of 0.25 to 0.10 inch of mercury. The mass of powdered material is kept under continual agitation by rotation of rod 26. Application of a vacuum of this order causes rapid evolution of moisture because the reduced pressure is well below the vapor pressure of moisture contained within the material. Rapid evolution of moisture is accompanied by loss of heat and cooling of the material to a relatively low temperature.

In addition to reducing the moisture content and cooling the material, the present process is highly effective in removing free oxygen which may be occluded or entrapped in the particles of material. Oxygen and other gases from the air are inevitably present in the material by virtue of exposure of the material to heated air during spray drying or other drying operation utilized for initially converting the material to divided solid form. With the present process evolution of moisture by subjecting the hot material to a high vacuum greatly facilitates rapid removal of free oxygen, and the free oxygen content can be reduced to a value of the order of 1% or less in a comparatively short time, such as one hour or less. On the other hand when milk powder containing from 1½ to 2½% moisture and at ordinary atmospheric temperature is subjected to a high vacuum, the free oxygen is removed with greatest difficulty and it is necessary to maintain a mass of material under the high vacuum for a prolonged period such as 24 hours or longer and to employ one or more dilutions with an inert gas like nitrogen, in order to approach the effectiveness of oxygen removal accomplished in the present process.

After a comparatively short interval of time, during which application of vacuum is maintained, the moisture content of the material is reduced to a value of from say 1½ to 2%, the temperature of the material is reduced to say 110° F. and the free oxygen reduced to about 0.8%. During the vacuum treatment vapor evolved passes through pipe 32 to the condenser 33, where vapor is condensed with water and withdrawn through the condensate pipe 37.

At the end of the vacuum treatment valve 45 is closed and valve 41 is turned to break the vacuum in chamber 24 by venting in gas through pipe 42. Assuming that this is an inert gas like nitrogen, which is preferred practice, the particles of the powdered material are enveloped in the inert gas and are removed together with this gas when withdrawn through pipe 29. It is desirable to have this pipe connect directly with equipment whereby the material is introduced into sealed containers for distribution to the trade, or if desired the material can be introduced into closed storage chambers, before being placed in sealed containers.

To review the advantages of the present process, it is possible to operate the spray drier 14 or other drying apparatus employed at relatively high capacity, with effective and efficient reduction in moisture content to a relatively low value in the final stage of the process. Prolonged exposure to elevated temperatures in the primary drying stages is completely avoided, and thus the material leaves these stages in unimpaired condition. Long storage of the powdered material at elevated temperatures is avoided and the residual sensible heat of the particles after preliminary drying is utilized in the final drying operation. In the final drying operation there is no impairment to the quality or keeping properties of the milk, particularly as contrasted with the impairment taking place in prior conventional secondary drying.

The final product is not only of the desired moisture content but in addition it is associated with a relatively low percentage of free oxygen, that is of the order of 1% or less. It has been found that such a low percentage of free oxygen makes possible retardation in the oxidation of non-fat milk solids such as causes development of a stale flavor, as well as to inhibit oxidation of fats. Thus the present product is more effectively preserved against development of undesirable flavors and in general has a longer keeping period. With respect to retarding oxidation of non-fat solids the invention is applicable to the production of dry skim milk, as well as to milk products like whole milk which have a substantial fat content.

I claim:

1. In a process for the manufacture of powdered milk products from liquid lacteal material, the steps of spraying the material into contact with hot air in a controlled drying chamber, removing the relatively high humidity gas from the chamber, removing powdered product from the bottom of the chamber at an elevated temperature of the order of from 170° F. to 185° F. and having a moisture content of the order of from 3.5 to 5% and before any appreciable drop in temperature has occurred, subjecting the powder to a relatively low pressure of the order of from 0.25 to 0.10 inch of mercury for the relatively short period of time sufficient to evaporate the moisture content of the powder down to a value of the order of from 1.0 to 2.0%, said evaporation effecting substantial cooling of the powder.

2. In a process for the manufacture of dry powdered milk products from liquid lacteal material, the steps comprising spraying a milk concentrate into contact with hot air in a controlled drying chamber, removing a portion of the relatively humid air from the top of the chamber, removing the hot powdered product having a moisture content of the order of from 3.5 to 5.0% and the remaining portion of said humid air from the bottom of the chamber, separating the powder from said air and before appreciable drop in temperature has occurred, subjecting the powder to a relatively low pressure of the order of from 0.25 to 0.10 inch of mercury for the relatively short period of time sufficient to evaporate the moisture content of the powder down to a value of the order of from 1.0 to 2.0%, said evaporation effecting substantial cooling of the powder.

3. In a process for the manufacture of dry powdered milk products from liquid lacteal material, the steps comprising spraying a milk concentrate into contact with hot air in a controlled drying chamber, removing the relatively humid air and the hot powdered product having a moisture content of the order of from 3.5 to 5.0% from the bottom of the chamber, separating the powder from the air and before any appreciable drop in temperature has occurred, subjecting the powder to a relatively low pressure of the order of from 0.25 to 0.10 inch of mercury for the relatively short period of time sufficient to evaporate the moisture content of the powder down to a value of the order of from 1.0 to 2.0%, said evaporation effecting substantial cooling of the powder.

4. In a process for the manufacture of dry powdered products from liquid lacteal material, the steps comprising spraying the material into contact with hot air in a controlled drying chamber, removing a portion of relatively humid air from the chamber at a point removed from the point of powder discharge, removing the hot powdered product having a moisture content of the order of from 3.5 to 5.0 per cent and the remaining portion of said humid air from the chamber, separating the powder from said air and before appreciable drop in temperature has occurred, subjecting the powder to a relatively low pressure of the order of from 2 to 0.10 inches of mercury for the relatively short period of time sufficient to evaporate the moisture content of the powder down to a value of the order of from 1.0 to 2.0 per cent, said evaporation effecting substantial cooling of the powder.

5. In a process for the manufacture of dry powdered products from liquid lacteal material, the steps comprising spraying the material into contact with hot air in a controlled drying chamber, removing a portion of relatively humid air from the chamber at a point removed from the point of powder discharge, removing the hot powdered product having a moisture content of the order of from 3.5 to 5.0 per cent and the remaining portion of said humid air from the chamber, separating the powder from said air and before appreciable drop in temperature has occurred, subjecting the powder to a relatively low pressure of the order of from 3 to 0.10 inches of mercury for the relatively short period of time sufficient to evaporate the moisture content of the powder down to a value of the order of from 1.0 to 2.0 per cent, said evaporation effecting substantial cooling of the powder.

6. In a process for the manufacture of dry milk products from liquid lacteal materials, the steps of spraying the material into contact with hot gas in a controlled drying chamber, removing the major portion of the relatively humid gas from the top of said chamber, removing a minor portion of the humid gas together with the hot pulverulent product of predetermined moisture content higher than desired in the final product from the bottom of said chamber, separating the pulverulent material from the humid gas with which it is associated as it leaves the drying chamber and before too appreciable a drop in the temperature of said material has occurred, subjecting the pulverulent material to the action of a high vacuum for the relatively short period of time to evaporate a sufficient portion of the moisture from the hot powder to effect substantial cooling.

7. In a process for the manufacture of dry milk products from liquid lacteal materials, the steps of spraying a milk concentrate into contact with hot gas in a controlled drying chamber, removing the relatively humid gas from the upper region of the chamber, removing the hot pulverulent product of predetermined moisture content higher than desired in the final product from the bottom of said chamber, subjecting the hot product as it leaves the drying chamber to subatmospheric pressure substantially below the vapor pressure of the moisture contained in the hot pulverulent product whereby a portion of the moisture content is flashed off and the pulverulent product cooled.

8. In a process for the manufacture of dry powdered products from liquid lacteal material, the steps comprising spraying the material into contact with hot air in a controlled drying system, removing humid air from at least one point in the system removed from the point of powder discharge, removing the hot powdered product having a predetermined moisture content several per cent higher than desired in the final product from the system, and before appreciable drop in temperature has occurred, subjecting the hot material to a relatively low sub-atmospheric pressure for the relatively short period of time sufficient to evaporate the moisture content of the powder down to a value of the order of from 1 to 2%, said evaporation effecting substantial cooling of the powder.

9. In a process for the manufacture of dry products from liquid lacteal materials, the steps comprising spraying the material into a controlled drying chamber to form a pulverulent material of a predetermined moisture content higher than desired in the final product, removing said pulverulent material from said drying chamber while hot and conveying it to the cooling chamber under conditions to minimize loss of heat, and then subjecting a mass of the pulverulent material to sub-atmospheric pressure substantially below the vapor pressure of the moisture contained in the hot pulverulent material whereby a portion of the moisture content is flashed off and the material cooled.

10. In a process for the manufacture of powdered milk products wherein the liquid lacteal material is sprayed into contact with hot gas in a controlled drying chamber to produce a product which is removable from said drying chamber as a hot powder, the steps comprising removing powdered products of predetermined moisture content higher than desired in the final product from said chamber at an elevated temperature and subjecting the hot powder to sub-atmospheric pressure substantially below the vapor pressure of the moisture contained in the hot powder whereby a portion of the moisture content is flashed off and the powder cooled.

11. In a process for the manufacture of powdered milk products from liquid lacteal material, the steps of effecting primary drying of the lacteal material by heat transfer to the same to form a hot divided solid material having a moisture content substantially in excess of the moisture content of the final product, and then transferring the material without substantial loss of sensible heat to a zone of secondary treatment in which the material is subjected to a vacuum below the vapor pressure of moisture remaining in the material to thereby rapidly reduce the moisture content and cool the same.

PAUL F. SHARP.

Disclaimer 2,412,635.—*Paul F. Sharp*, Piedmont, Calif. PROCESS FOR PRODUCING DRIED MILK POWDER. Patent dated Dec. 17, 1946. Disclaimer filed July 14, 1948, by the assignee, *Golden State Company, Ltd.*

Hereby disclaims claims 9, 10, and 11 of said patent.

[*Official Gazette August 17, 1948.*]

point of powder discharge, removing the hot powdered product having a moisture content of the order of from 3.5 to 5.0 per cent and the remaining portion of said humid air from the chamber, separating the powder from said air and before appreciable drop in temperature has occurred, subjecting the powder to a relatively low pressure of the order of from 3 to 0.10 inches of mercury for the relatively short period of time sufficient to evaporate the moisture content of the powder down to a value of the order of from 1.0 to 2.0 per cent, said evaporation effecting substantial cooling of the powder.

6. In a process for the manufacture of dry milk products from liquid lacteal materials, the steps of spraying the material into contact with hot gas in a controlled drying chamber, removing the major portion of the relatively humid gas from the top of said chamber, removing a minor portion of the humid gas together with the hot pulverulent product of predetermined moisture content higher than desired in the final product from the bottom of said chamber, separating the pulverulent material from the humid gas with which it is associated as it leaves the drying chamber and before too appreciable a drop in the temperature of said material has occurred, subjecting the pulverulent material to the action of a high vacuum for the relatively short period of time to evaporate a sufficient portion of the moisture from the hot powder to effect substantial cooling.

7. In a process for the manufacture of dry milk products from liquid lacteal materials, the steps of spraying a milk concentrate into contact with hot gas in a controlled drying chamber, removing the relatively humid gas from the upper region of the chamber, removing the hot pulverulent product of predetermined moisture content higher than desired in the final product from the bottom of said chamber, subjecting the hot product as it leaves the drying chamber to sub-atmospheric pressure substantially below the vapor pressure of the moisture contained in the hot pulverulent product whereby a portion of the moisture content is flashed off and the pulverulent product cooled.

8. In a process for the manufacture of dry powdered products from liquid lacteal material, the steps comprising spraying the material into contact with hot air in a controlled drying system, removing humid air from at least one point in the system removed from the point of powder discharge, removing the hot powdered product having a predetermined moisture content several per cent higher than desired in the final product from the system, and before appreciable drop in temperature has occurred, subjecting the hot material to a relatively low sub-atmospheric pressure for the relatively short period of time sufficient to evaporate the moisture content of the powder down to a value of the order of from 1 to 2%, said evaporation effecting substantial cooling of the powder.

9. In a process for the manufacture of dry products from liquid lacteal materials, the steps comprising spraying the material into a controlled drying chamber to form a pulverulent material of a predetermined moisture content higher than desired in the final product, removing said pulverulent material from said drying chamber while hot and conveying it to the cooling chamber under conditions to minimize loss of heat, and then subjecting a mass of the pulverulent material to sub-atmospheric pressure substantially below the vapor pressure of the moisture contained in the hot pulverulent material whereby a portion of the moisture content is flashed off and the material cooled.

10. In a process for the manufacture of powdered milk products wherein the liquid lacteal material is sprayed into contact with hot gas in a controlled drying chamber to produce a product which is removable from said drying chamber as a hot powder, the steps comprising removing powdered products of predetermined moisture content higher than desired in the final product from said chamber at an elevated temperature and subjecting the hot powder to sub-atmospheric pressure substantially below the vapor pressure of the moisture contained in the hot powder whereby a portion of the moisture content is flashed off and the powder cooled.

11. In a process for the manufacture of powdered milk products from liquid lacteal material, the steps of effecting primary drying of the lacteal material by heat transfer to the same to form a hot divided solid material having a moisture content substantially in excess of the moisture content of the final product, and then transferring the material without substantial loss of sensible heat to a zone of secondary treatment in which the material is subjected to a vacuum below the vapor pressure of moisture remaining in the material to thereby rapidly reduce the moisture content and cool the same.

PAUL F. SHARP.

Disclaimer 2,412,635.—*Paul F. Sharp*, Piedmont, Calif. PROCESS FOR PRODUCING DRIED MILK POWDER. Patent dated Dec. 17, 1946. Disclaimer filed July 14, 1948, by the assignee, *Golden State Company, Ltd.*
Hereby disclaims claims 9, 10, and 11 of said patent.
[*Official Gazette August 17, 1948.*]